March 7, 1939.  J. B. McCLATCHY ET AL  2,149,784

ART OF BUILDING CONSTRUCTION

Filed April 27, 1937   5 Sheets-Sheet 1

Inventors:—
John B. McClatchy
Jesse P. Mottenhot
Vincent Mercaldo
By Leonard L. Kalish
Attorney

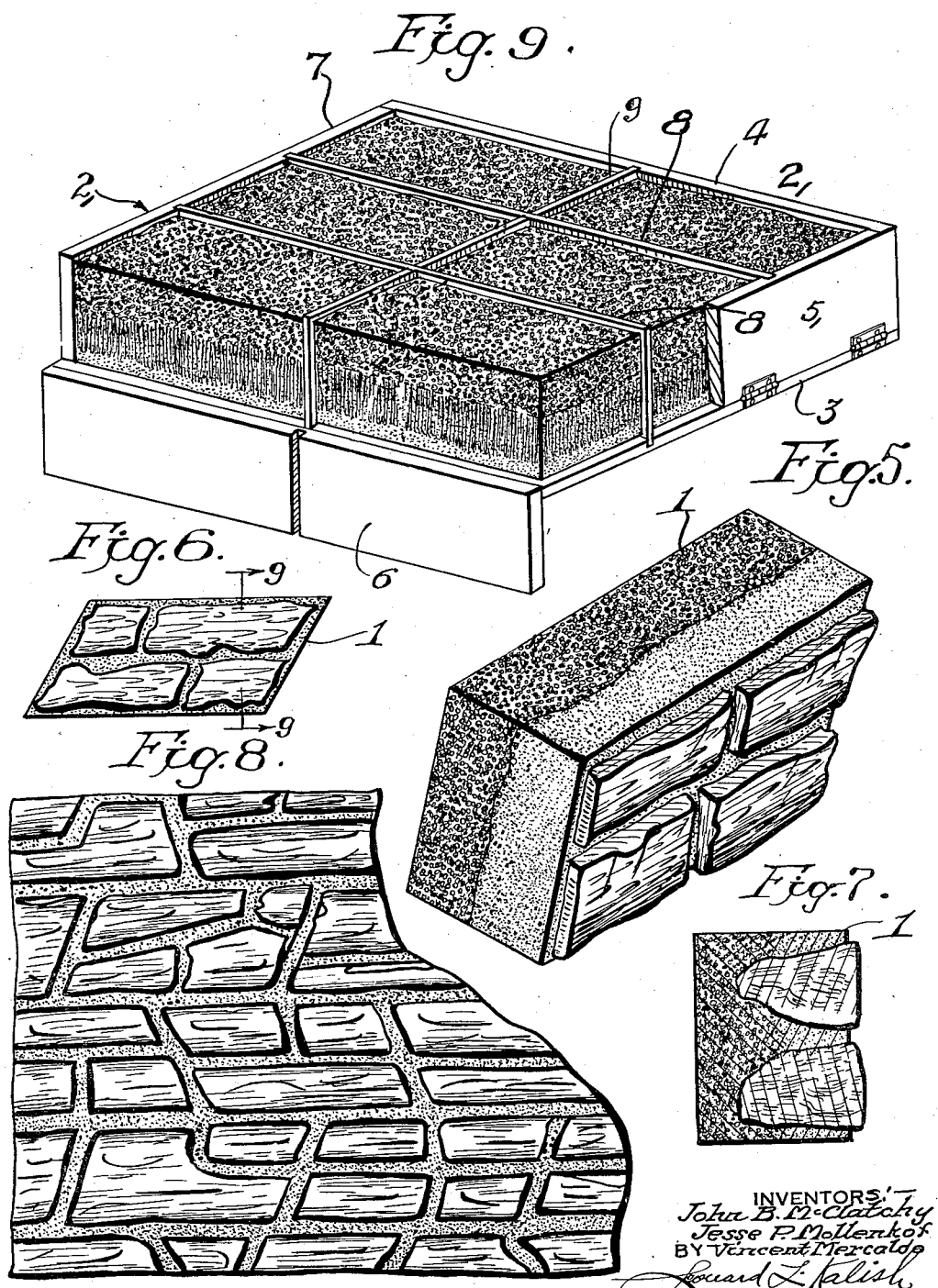

March 7, 1939. J. B. McCLATCHY ET AL 2,149,784
ART OF BUILDING CONSTRUCTION
Filed April 27, 1937 5 Sheets-Sheet 4
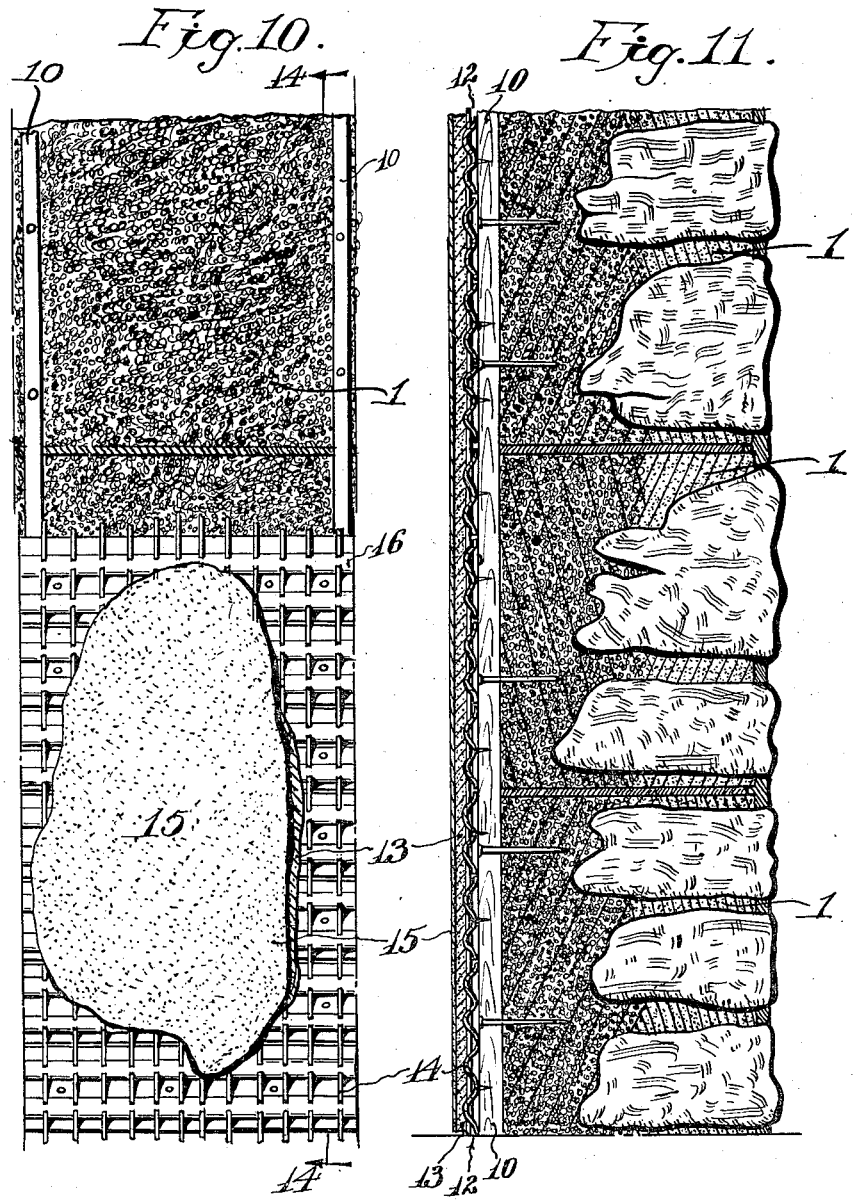
INVENTORS:
John B. McClatchy
Jesse P. Hollenhof
BY Vincent Mercado
Leonard L. Kalish
ATTORNEY March 7, 1939.   J. B. McCLATCHY ET AL   2,149,784
ART OF BUILDING CONSTRUCTION
Filed April 27, 1937   5 Sheets-Sheet 5
*Fig. 13*
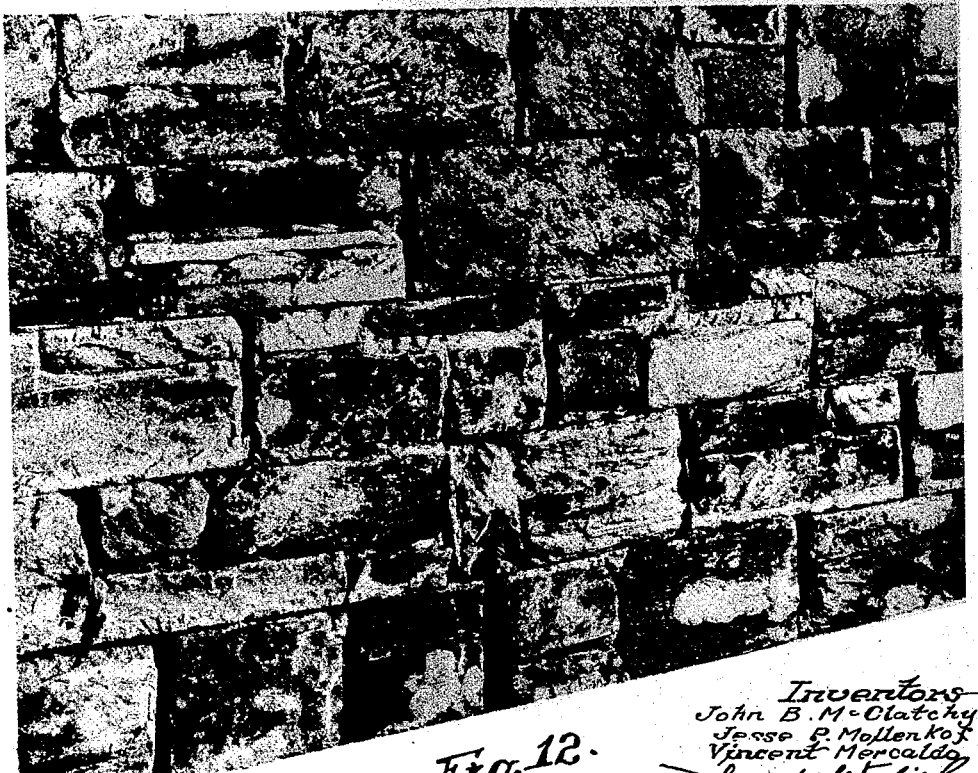
*Fig. 12.*
Inventors
John B. McClatchy
Jesse P. Mollenkof
Vincent Mercaldo
By Leonard L. Kalish
Attorney Patented Mar. 7, 1939

2,149,784

UNITED STATES PATENT OFFICE

2,149,784

ART OF BUILDING CONSTRUCTION

John B. McClatchy, Lower Merion, Jesse P. Mollenkof, Springfield Township, Montgomery County, and Vincent Mercaldo, Germantown, Pa., assignors to Rosemary D. McClatchy, Overbrook, Pa.

Application April 27, 1937, Serial No. 139,890

9 Claims. (Cl. 72—35)

The present invention relates to certain new and useful building construction, and it relates more particularly to the construction of walls of buildings such as domestic dwellings.

Because of its fire-proof characteristics, its generally greater durability and lower maintenance cost, and perhaps for many other reasons, stone or masonry materials, both natural and artificial, have been preferred for both domestic as well as commercial and industrial construction in the walls of buildings. Of the many materials available, both natural, (such as natural stone) and artificial, (such as brick, cement block, cinder block, monolithic concrete, etc.) which have been commonly used, perhaps natural stone has been regarded as the most desirable for domestic purposes because of its artistic value and because of the many esthetic concepts expressible through natural stone in the hands of architects and experienced stone masons.

One of the principal drawbacks to the use of natural stone in low-priced dwellings, however, has been its comparatively greater cost. This is due to the fact that natural stone, owing to its irregularities, requires a much thicker wall than is required by either brick or cement block or cinder block, and the generally increased cost in handling and laying or setting stone.

Numerous attempts have been made in the past to produce building blocks which, when set in a wall, would have an artistic value beyond that of ordinary cement block. To this end, cement blocks or concrete blocks have been made with smaller stone and pebbles in its face and also with larger more or less round-faced stones embedded therein at intervals and also with small stones placed in one face of the concrete or cement block in mosaic fashion.

United States Patents Nos. 139,050; 527,416; 708,248; 719,244; 1,169,985; 1,809,504; 1,856,906; 1,916,308; and many others, exemplify the many and varied attempts in this direction. All of these prior attempts, however, have fallen short of a practical solution to the long standing problem of placing a wall having in fact the appearance of a natural stone wall, within the reach of those who can only afford homes within the low or lowest price ranges. Thus, the problem may fairly be stated to be two-fold. One phase of the problem is to so construct a wall, (and the units of which it is laid) that when the wall is finished, it will have the appearance of a natural stone wall and will be indistinguishable from a natural stone wall. The other phase of the problem is to produce such stone wall at such a low cost that it will be within the reach of a greater proportion of home builders and within the reach of home builders of larger areas including areas which do not have local stone readily available. A further problem therefore is the formation of wall units which can be laid simply and quickly and without any special "matching" of adjacent units to each other and without any special keying of such units to each other and which will nevertheless give to the wall the appearance of a natural solid stone wall and in which wall the outlines of the wall units themselves will be completely obliterated and imperceptible.

With the above and other objects in view, the present invention consists of a building wall formed of superimposed rows of wall units, each more or less approximately 12 to 24 or 30 inches long, 6 to 12 or 14 inches high, and having more or less approximately the thickness of a conventional cement block or cinder-cement block, that is, eight to ten inches, and whose upright juncture faces are preferably somewhat inclined to the horizontal faces thereof, and the face of which units contains a relatively few or comparatively large and generally flat-faced natural stones in any suitable variegated layout, but with their facial boundaries relatively closely spaced to each other and relatively closely spaced in relation to the edges of the wall unit, which stones have a depth less than the depth or thickness of the wall unit and which are generally surrounded on all sides except their faces and a small portion of their sides marginal to the faces with a relatively rich cement and sand mixture which extends to approximately half the depth or thickness of the wall unit and which wall unit is formed in its inner half of a relatively porous or loose concrete mixture including some porous materials such as cinders of suitable grade.

The present invention further consists of a wall construction formed of units of the kind above stated, wherein the relatively few or relatively large natural stones in the successive and adjacent units are then brought into a common pattern in which the outlines of the units are obliterated by a superimposed layer of plastic cement-sand mixture applied between the sides of the stones marginal to their faces in such a way that the stones throughout the face of the wall are outlined with such superimposed plastic cement which subsequently hardens in place, and outlines all the stones equally and without perceptible variation between adjacent wall units, so that the resultant stone wall will have the true appearance of an all-stone wall or of a solid stone wall.

The present invention further consists of other features and details of construction of wall and wall unit and method of making the same, all of which will appear more fully from the following description and accompanying drawings and from the appended claims.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Referring to the accompanying drawings in which like reference characters indicate like parts:

Figure 4 represents a close-up front elevational view of a wall construction embodying the present invention with the lower portion of the wall incomplete on its outer face, that is, without the intervening hard water-proof filler strips or pointing strips of cement mortar and with the upper portion of the wall filled in.

Figure 5 represents a more or less schematic perspective view of a wall unit embodying the present invention.

Figure 6 represents a similarly schematic front elevational view of the same.

Figure 7 represents a similar more or less schematic sectional view on line 7—7 of Figure 6.

Figure 8 represents a fragmentary and schematic view of a front wall surface.

Figure 9 represents a perspective view of a mold showing the manner in which the wall units of the present invention may be formed.

Figure 10 is a fragmentary and more or less schematic front elevational view of the inner wall construction showing the rear surface of the wall units partly exposed and showing the application thereto of the lath-carrying strips, the lath and plaster.

Figure 11 represents a section on line 11—11 of Figure 10 also giving a schematic representation of the wall construction of the present invention.

Figure 12 represents a close-up view of another somewhat modified form of wall construction using wall units of greater length and showing the units laid in rows without intervening layers of cement mortar however, but merely loosely laid upon each other.

Figure 13 represents a front elevational view of this modified form of wall unit as actually laid in a wall and filled.

Figure 1:
Figure 1 represents a perspective view of the front of a dwelling embodying the present invention.
Figure 4:
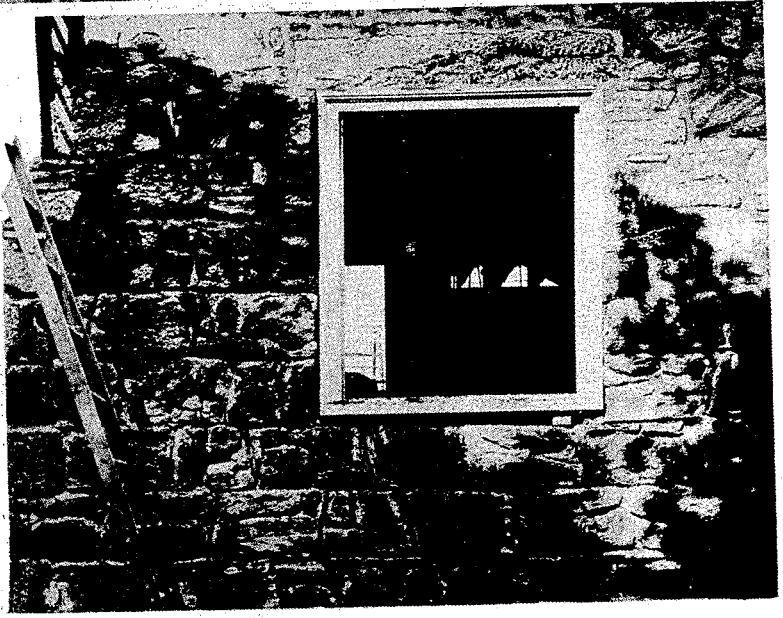
Figure 3:
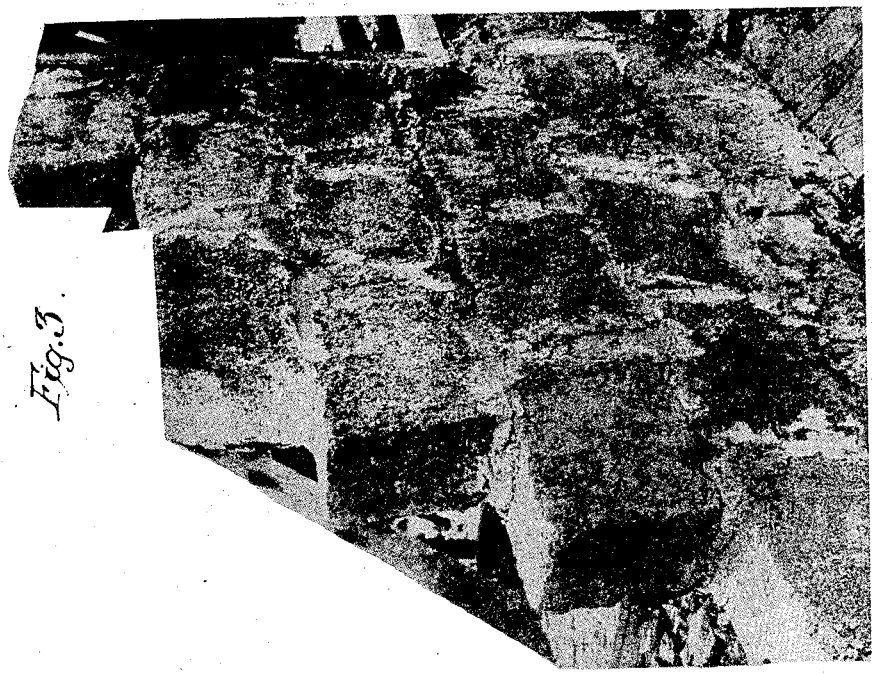
Figure 3 represents a similar perspective view of the same wall showing the rear of the wall and the end of the incompleted wall.
Figure 2:
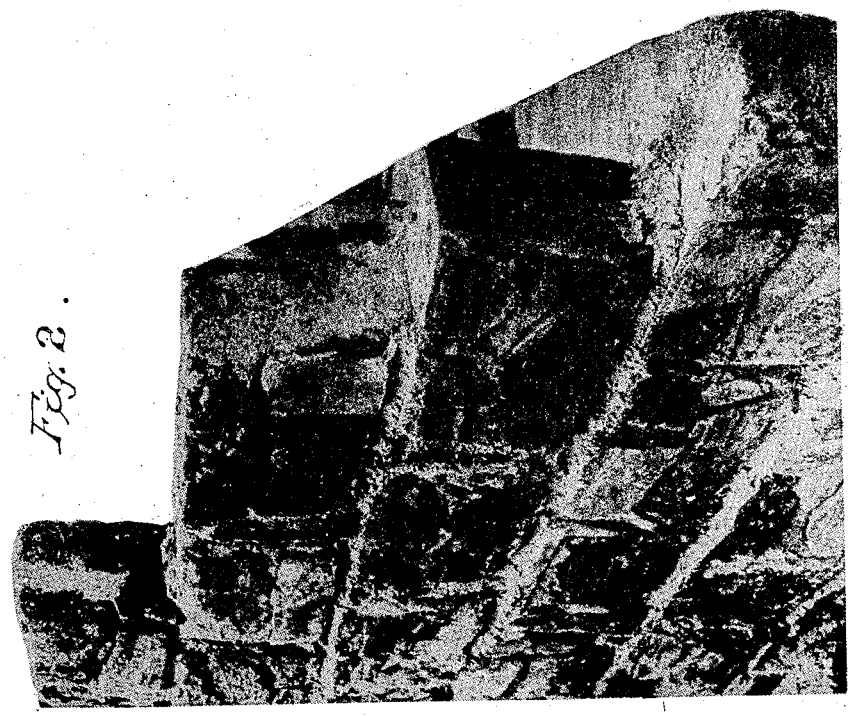
Figure 2 represents a perspective view of the exterior and end of a partially completed wall construction embodying the present invention, showing the manner in which the building units are laid.

The wall units designated generally by the numeral 1 and shown particularly in Figures 5, 6, and 12, may be either formed one at a time or may be formed in groups in a larger mold, such as that shown schematically in Figure 9. Thus, any suitable mold 2 having bottom 3 on the side walls 4, 5, 6 and 7, may be used with the side walls demountable in any suitable way by means of clamps, hinges, or other suitable means, for effecting a temporary quick detachable and attachable connection between the side walls and the bottom. The mold 2 may be provided with any suitable number of longitudinal partitions 8 depending on the size of the mold in relation to the size of the unit, and one or more transverse partitions 9, also depending on the size of the mold in relation to the size of the mold unit. If wall units of the inclined-side type shown in Figures 1 to 6 are desired, then the transverse partition 9 as well as the side walls 5 and 7 are somewhat inclined with respect to the longitudinal partitions 8 and side-walls 4 and 6, so that the upright juncture side-walls of the unit will be inclined to the horizontal juncture side-walls of the unit. In the particular illustration shown, the inclination is 10 to 15 degrees from the vertical.

The depth of the mold need be only approximately the depth of the wall unit, that is, 8 to 10 inches or perhaps with some slight additional depth for clearance. The spacing of the longitudinal partitions 8 from each other and from the longitudinal side walls 4 and 6, and the spacing of the transverse partition 9 from the transverse side walls 5 and 7, corresponds to the dimensions of the wall units, and this may vary within a suitable range as the dimensions of the wall unit may also vary within a suitable range.

The bottom of the mold is first covered with a layer of sand either dry or slightly damp, and of a depth of perhaps a quarter of an inch to an inch, more or less.

The natural stone preferably a local stone directly from the quarry, is then placed into the mold over the thin layer of sand on the bottom of the mold, with the bottom or face area of each unit substantially covered with stone laid over the sand. The stones are laid with a generally flat surface facing downwardly on the sand and with the facial edges of the stone more or less closely spaced to each other and to the boundaries of the mold section, which forms the wall unit. The stones are all comparatively shallow so they will occupy substantially less than the depth of the mold and hence substantially less than the depth of the wall unit. The side walls of the stones may extend in a generally upright direction when placed in the mold or such side walls of the stones may taper substantially. Thus, the upper surfaces of the stones (in the mold) or the inner or concealed rear surfaces of the stones (in the finished wall unit) may have either generally the same area, or a substantially smaller area than the front facial area of the stone.

The weight of the stones laid on the sand causes the stones to imbed themselves in the layer of sand to a slight extent and causes the sand to rise in the slight spaces between the adjacent stones and the slight spaces between the stones and the boundary walls of the mold sections. This may be accentuated by pressing each stone slightly into the sand, if desired.

A more or less plastic or wet cement and sand mixture or aggregate having more or less approximately one part of cement to four parts of sharp sand or stone grit therein, is then poured into the mold over the stone so as to fill all the spaces between adjacent stones and between the stones and the boundary walls of the mold sections. This is poured in to approximately one-half the depth of the mold.

A small amount (as for instance 5% to 10%, more or less) of lime may also be included in the first or outer layer of cement mixture just above mentioned, particularly when using the four parts of sharp sand. When using the four parts of stone grit instead, the lime may be dispensed with.

A second cement mixture is then prepared for the back or rear layer of the wall unit. This cement mixture consists of one part of cement to seven parts of screened cinders. Some portion of the seven parts of cinders may be replaced by an equivalent amount of sand, if desired. This cement-cinder mixture, also in a wet condition, is then poured directly over the first cement-sand mixture while the first mixture is still wet and preferably before it has set. Indeed, it may be poured over the first mixture as soon as the first layer has been poured. In this way, a firm and permanent bond is obtained between the two layers of different composition. This second layer is poured to a depth to make up the balance of the required depth of the wall unit. Thus, if a first layer were poured to an effected depth of four inches, then the second layer would be poured for another four or five inches, so that the combined depth of the two layers will be 8, 9 or 10 inches, depending on the depth of the wall unit desired.

The units are then allowed to "set" in a quiescent state until they have hardened sufficiently. Then the mold is dismantled by the removal of clips, locks, clamps, or other fastening means, and the wall units removed to dry, or to be further cured by subjection to steam for a suitable length of time before drying.

In order to insure a firm bond between the side walls and back walls of the stones and the cement mixtures contiguous to such walls, it may be necessary to wash the stones so as to free these surfaces of all loose materials, such as sand, grit, or adhering earthy material, before placing them into the mold.

For finished ends of walls, as for instance in turning a corner between two walls at a right angle to each other, the mold is varied so that one transverse boundary of the mold section will be at a right angle to the longitudinal or horizontal partitions or boundaries so that the wall unit will have one of its upright surfaces in a vertical position or at a right angle to the horizontal side walls of the unit. In this latter formation the wall unit is formed with two faces at a right angle to each other, to wit, the bottom face and the end or upright face, at a right angle to the horizontal or longitudinal face. In this case not only is the bottom of the mold covered with sand but a small amount of wet sand is placed between the side of the mold which is to form the other face and the stone faces generally adjacent thereto so that the first cement mixture will leave these stone faces clear. In this formation also the stone is laid for the full depth of the mold on the finished side-face of the unit and flat stone faces are presented on that side of the mold.

The wall units are laid in horizontal rows in a manner shown in Figures 2, 3, 4 and 8 with the units of successive rows staggered and with the inclination of the upright juncture side walls of the units oppositely directed in successive rows thereby automatically producing an interlocking effect which greatly increases the resistance of the wall to transverse pressure and serves to further obliterate the juncture lines between units, in the finished wall structure.

The wall units are laid with but a thin spread of a suitable plastic cement-and-sand mixture between the adjacent horizontal and upright juncture sides of the wall units. After the bonding spread of cement-and-sand layers have set a denser and more water proof or water resistant pointing mixture of cement and sand is applied in a thin layer between the stones so as to outline them in any desired style, either by a flat pointing or sharp pointing or line pointing.

Wooden lath-supporting studs 10 may be nailed directly to the inner, porous sand-cinder rear portions of the wall units 1, which are sufficiently porous to permit the penetration of nails and to hold such nails firmly and to afford heat insulation. Owing to the fact that the outer cement-sand mixture intervening the stones gives protection against moisture from without, while the inner cement-cinder layer affords a high degree of heat insulation (to prevent loss of heat in the winter and transmission of heat from without in the summer), a comparatively lesser air space may be employed between the inner cinder-cement surface and the interior sheathing of the wall, whether that interior sheathing be of plaster laid in situ, or pre-formed plaster board or other pre-formed sheathing, such as wood panels or composition wall board.

Thus, wooden cleats or studs 10 of comparatively small thickness may be nailed directly to the cement-cinder surface in suitably spaced relation to each other. To secure alignment between lath-carrying studs 10, spacer pieces or wedges 11 may be inserted between studs 10 and the cinder-cement surface at the points of nailing. To these wooden lath-carrying cleats or studs 10, either wooden lath strips or expanded metallic lath may be nailed, or other plaster-receiving material such as the metallic foil-and-wire material 12 shown in Figures 10 and 11.

A rough coat of plaster 13 is then applied to the lath material 12 in interlocking or bonded relation to the wires 14 thereof and a thinner white smooth coat of plaster 15 is then superimposed thereon. The metal foil 16 serves as insulation against radiant heat transmission and also as a backing for the rough plaster. The metal foil 16 is preferably backed by paper sheathing.

If desired, pre-formed sheathings such as plaster board, fibrous wall board or wooden board may be used instead of lath.

Owing to the combination of the outer waterproofing cement-sand body intervening the stones and the inner cinder-cement body, the inner cinder-cement surface may be finished directly with plaster for interiors other than dwelling rooms, as for instance for the interior of a garage space. Thus, a cement-sand plastic mixture may be spread directly over the inner cinder-cement body, and smoothed off, or any brown coating material may be spread directly over it and then finished with a white-coating plastic material.

It will be seen that the wall units 1 may be laid without any "matching" of adjacent units, because the juncture side-walls of the units, (that is, both the horizontal side-walls as well as the upright side-walls) are flat and unbroken, and uniformly regular. As the faces of the stones are all more or less flat, with but comparatively small spaces between them, and also owing to the fact that the facial areas of the stones are comparatively large in relation to the spaces intervening the stones in their facial plane, the subsequent pointing not only produces the effect of natural stone laid and pointed with cement, but also can so blend all the stones into one wall pattern as to completely obliterate the outlines of the individual units, so that a view of the finished wall suggests a solid all-stone wall, and indeed will have every appearance of a solid all-stone wall, as shown in Figures 1 and 13. Owing to the regularity of all meeting or juncture surfaces of the wall units, the wall thickness is reducible to a minimum. Thus, while an all-stone or solid stone wall for the same construction may require a wall depth or thickness of sixteen to eighteen inches, the wall construction of the present invention requires a wall depth or thickness of only eight or nine inches, approximately one-half of the conventional wall thickness.

Having thus described the invention, what is hereby claimed as new and desired to be secured by Letters Patent is:

1. A wall construction having the appearance of a regular-masonry stone wall and comprising successive, superimposed, horizontal rows of pre-formed, composite wall units, whose adjacent juncture surfaces are generally flat and regular throughout their width;—each of said wall units including a cast cement-mixture body and an outer layer of natural irregularly flat-faced stones embedded in said cement-mixture body, and having relatively large exposed facial areas in relation to the clearances between the stones in their facial plane, thin bonding cement-mixture layers intermediate the juncture surfaces of adjacent wall units, and water-resistant cement pointing superimposed upon the outer edge portion of said bonding layer and upon the outer cast-cement body portions between stones and generally in their facial plane and uniting the stones into a single, variegated stone pattern and obscuring the boundaries of the wall units, to produce the appearance of an individually-laid-stone wall.

2. A wall construction having the appearance of a regular-masonry stone wall and comprising successive, superimposed and generally horizontal rows of pre-formed composite wall units having generally horizontal juncture surfaces and generally inclined juncture surfaces; each of said juncture surfaces being generally flat and regular throughout the width of the wall; each of said wall units including a cast cement mixture body and an outer layer of natural irregularly flat-faced stones embedded in said cement-mixture body, and having relatively large exposed facial areas in relation to the clearance between the stones in their facial plane, layers of bonding cement-mixture intermediate the juncture surfaces of adjacent wall units of a thickness such as to separate the marginal portions of the stones in adjacent units to an extent approximately the same as the average separation between stones within the units, and a separate, relatively hard and dense cement mixture layer superimposed upon the aforesaid bonding layers and upon the cement mixture intermediate the stones in generally continuous pointing bands, uniting the stones into a single, variegated stone pattern and disguising the boundaries of the individual wall units to produce the appearance of an individually-laid-stone wall, and increasing the resistance of the wall structure to water from without.

3. A wall construction having the appearance of a regular-masonry stone wall and comprising successive, superimposed, horizontal rows of pre-formed composite wall units, whose adjacent juncture surfaces are generally flat and regular throughout their width, each of said wall units including natural irregularly flat-faced stones having outer exposed faces in general alignment with each other and spaced a slight distance from each other and an outer generally hard waterproof cast cement mixture surrounding said stones from the outer surface of said units to a substantial distance inwardly of said outer surface and a relatively porous and less dense cast cement mixture surrounding said stones and extending rearwardly thereof to the rear surface of said units; said two cement bodies being integrally united with each other and forming continuations of each other, thin bonding cement-mixture layers intermediate the juncture surfaces of adjacent wall units, and water-resistant cement pointing superimposed upon the outer edge portion of said bonding layer and upon the outer cast-cement body portions between stones and generally in their facial plane and uniting the stones into a single, variegated stone pattern and obscuring the boundaries of the wall units to produce the appearance of an individually-laid-stone wall.

4. A wall construction having the appearance of a regular-masonry stone wall and comprising successive, superimposed horizontal rows of pre-formed composite wall units, whose adjacent juncture surfaces are generally flat and regular throughout their width, and each of said units having generally horizontal upper and lower juncture surfaces and generally inclined and parallel side juncture surfaces, each of said wall units including natural irregularly flat-faced stones having outer exposed faces in general alignment with each other and spaced a slight distance from each other and an outer generally hard waterproof cast cement mixture surrounding said stones from the outer surface of said units to a substantial distance inwardly of said outer surface and a relatively porous and less dense cast cement mixture surrounding said stones and extending rearwardly thereof to the rear surface of said units; said two cement bodies being integrally united with each other and forming continuations of each other, thin bonding cement-mixture layers intermediate the juncture surfaces of adjacent wall units, and water-resistant cement pointing superimposed upon the outer edge portion of said bonding layer and upon the outer cast-cement body portions between stones and generally in their facial plane and uniting the stones into a single, variegated stone pattern and obsuring the boundaries of the wall units, to produce the appearance of an individually-laid-stone wall.

5. A wall construction having the appearance of a regular-masonry stone wall and comprising successive, superimposed horizontal rows of pre-formed, composite wall units, whose adjacent juncture surfaces are generally flat and regular throughout their width; each of said wall units including a cast cement-mixture body and an outer layer of natural irregularly flat-faced stones embodied in said cement-mixture body, and having relatively large exposed facial areas in relation to the clearances between the stones in their facial plane, cast cement mixture substantially filling the clearances between the stones in the unit and recessed inwardly from the facial plane of the stones to a suitable extent, thin bonding cement-mixture layers intermediate the juncture surfaces of adjacent wall units, and cement pointing superimposed upon the outer edge portion of said bonding layer and upon the outer cast-cement body portions between stones and generally in their facial plane and uniting the stones into a single, variegated stone pattern and obscuring the boundaries of the wall units, to produce the appearance of an individually-laid-stone wall.

6. A wall construction having the appearance of a regular-masonry-stone wall and comprising successive, superimposed horizontal rows of preformed composite wall units whose adjacent juncture surfaces are generally flat and regular throughout their width, each of said wall units including an outer dense cast cement mixture body and an inner less dense cast cement mixture body integral with each other and natural irregularly flat-faced stones imbedded in said cast cement bodies and having relatively large exposed facial areas in relation to the clearances between the stones in their facial plane, thin bonding cement-mixture layers intermediate the juncture surfaces of adjacent wall units, and cement pointing superimposed upon the outer edge portion of said bonding layer and upon the outer cast-cement body portions between stones and generally in their facial plane and uniting the stones into a single, variegated stone pattern and obscuring the boundaries of the wall units, to produce the appearance of an individually-laid-stone wall.

7. A wall construction having the appearance of a regular-masonry stone wall and comprising successive, superimposed horizontal rows of preformed composite wall units whose adjacent juncture surfaces are generally flat and regular throughout their width, and each having an upper and lower horizontal surface and a pair of parallel and inclined side juncture surfaces; each of said wall units including an outer dense cast cement mixture body and an inner less dense cast cement mixture body integral with each other and natural irregularly flat-faced stones imbedded in said cast cement bodies and having relatively large exposed facial areas in relation to the clearances between the stones in their facial plane, thin bonding cement-mixture layers intermediate the juncture surfaces of adjacent wall units, and cement pointing superimposed upon the outer edge portion of said bonding layer and upon the outer cast-cement body portions between stones and generally in their facial plane and uniting the stones into a single, variegated stone pattern and obscuring the boundaries of the wall units, to produce the appearance of an individually-laid-stone wall.

8. A wall construction having the appearance of a regular-masonry stone wall and comprising successive, superimposed horizontal rows of preformed composite wall units whose adjacent juncture surfaces are generally flat and regular throughout their width; each of said wall units including an outer dense cast cement mixture body and an inner less dense cast cinder cement mixture body integral with each other and natural irregularly flat-faced stones imbedded in said cast cement bodies and extending substantially into both cast cement bodies, and having relatively large exposed facial areas in relation to the clearances between the stones in their facial plane, thin bonding cement-mixture layers intermediate the juncture surfaces of adjacent wall units, and cement pointing superimposed upon the outer edge portion of said bonding layer and upon the outer cast-cement body portions between stones and generally in their facial plane and uniting the stones into a single, variegated stone pattern and obscuring the boundaries of the wall units, to produce the appearance of an individually-laid-stone wall.

9. A wall construction having the appearance of a regular-masonry stone wall and comprising successive, superimposed horizontal rows of preformed composite wall units whose adjacent juncture surfaces are generally flat and regular throughout their width, and each having an upper and lower horizontal surface and a pair of parallel and inclined side juncture surfaces; each of said wall units including an outer dense cast cement mixture body and an inner less dense cast cinder cement mixture body integral with each other and natural irregularly flat-faced stones imbedded in said cast cement bodies and extending substantially into both cast cement bodies and having relatively large exposed facial areas in relation to the clearances between the stones in their facial plane, thin bonding cement-mixture layers intermediate the juncture surfaces of adjacent wall units, and water-resistant cement pointing superimposed upon the outer edge portion of said bonding layer and upon the outer cast-cement body portions between stones and generally in their facial plane and uniting the stones into a single, variegated stone pattern and obscuring the boundaries of the wall units, to produce the appearance of an individually-laid-stone wall.

JOHN B. McCLATCHY.
JESSE P. MOLLENKOF.
VINCENT MERCALDO.